Feb. 8, 1927.
J. J. BROCK
1,616,437
SECURING DEVICE FOR AUTOMOBILE LICENSE PLATES
Filed July 7, 1925
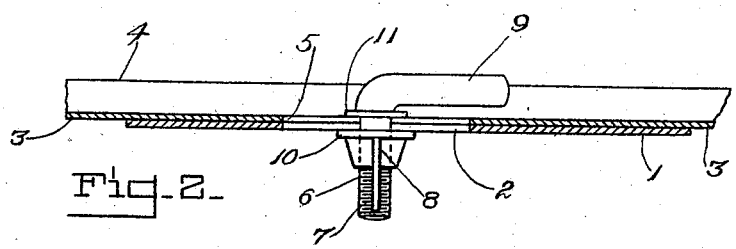
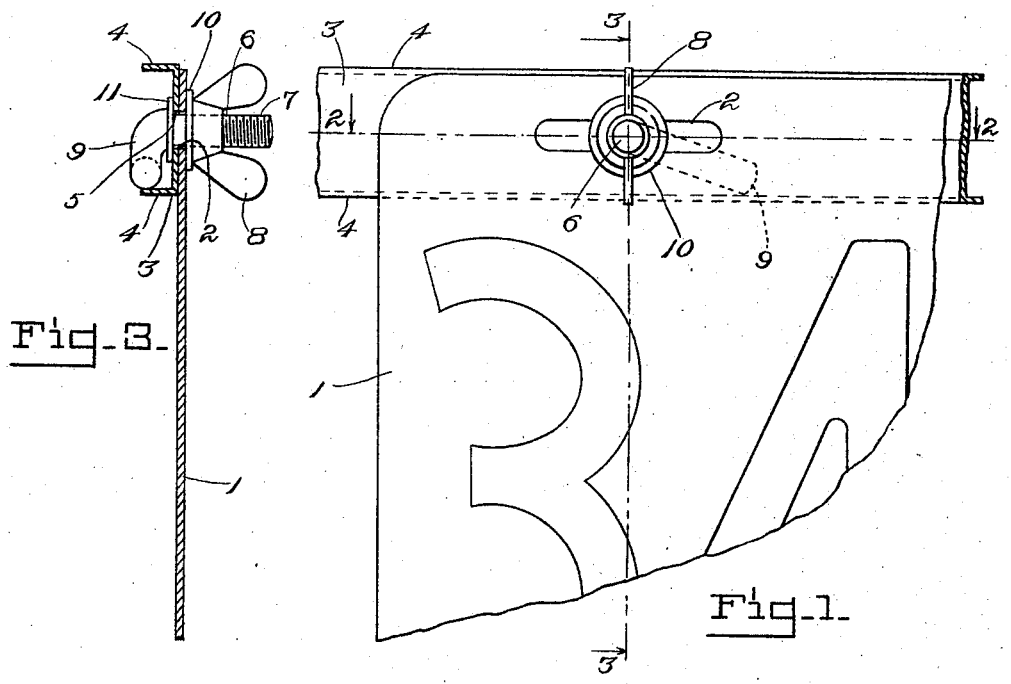
INVENTOR=
John J. Brock
by Macleod, Calvr, Copeland & Dike
ATTORNEYS=

Patented Feb. 8, 1927.

1,616,437

UNITED STATES PATENT OFFICE.

JOHN J. BROCK, OF BROCKTON, MASSACHUSETTS.

SECURING DEVICE FOR AUTOMOBILE LICENSE PLATES.

Application filed July 7, 1925. Serial No. 42,015.

The invention relates to means for securing license plates or tags to automobiles. The license plates or tags are usually secured by means of bolts to a bar or bracket which is permanently connected with the automobile. In the usual method a great deal of inconvenience is encountered in attempting to hold the bolt in place while screwing on the nut in applying the license tag and in unscrewing the nut while removing the tag on account of a tendency of the bolts to rotate while turning the nut. It is usually necessary to employ a monkey wrench or other tool to prevent rotation of the bolt while setting up or removing the nut and it is awkward and inconvenient to reach in behind the license plate and the bracket, as is necessary in doing this work. The object of the present invention is to provide a simple means whereby the license plate may be readily attached to and detached from the bracket and for preventing rotation of the bolt during such operation.

The invention will be fully understood from the following description when taken in connection with the accompanying drawings and the novel features thereof will be pointed out and clearly defined by the claims at the close of this specification.

In the drawings:

Fig. 1 is a fragmentary plan view of a license tag and bracket and the device embodying the invention.

Fig. 2 is a section taken on line 2—2, Fig. 1.

Fig. 3 is a section taken on line 3—3, Fig. 1.

Referring to the drawings:

There is shown at 1 a portion of a license plate of ordinary construction having elongated slots 2 as usual for passage of the bolts and for securing the tag to the automobile.

One of such slots is shown as only a portion of the license tag is shown in the drawings.

There is shown at 3 a portion of the bracket. The bracket is supposed to be permanently affixed to the automobile by bolts or other means, not shown, but it may be attached to the car in any well-known manner of securing to an automobile the bracket or bar to which the license tag is to be attached.

Preferably the bracket has flanges 4—4 along its edges extending at right angles to the face of the bracket thus constituting a channelled bracket.

The bracket is formed with elongated slots 5 with which the elongated slots 2 of the license tag will be brought into registration when the license plate is to be attached to the bracket.

The means for securing the license tag to the bracket consists of bolts 6 having the screw threaded portions 7 at one end to receive a wing nut 8 and being bent at the other end to form a unitary, laterally extending arm 9. In securing the license tag to the bracket, the tag will be positioned so that the elongated slots 2 are in registration with the slots 5 in the bracket, then the bolts 6 will be inserted from the inside through the said slots in the bracket and tag, care being taken to have the arm 9 lie in the channel of the bracket and then the wing nut 8 will be set up. Preferably washers 10 and 11 are placed on the bolt respectively between the license tag and the face of the wing nut and between the bracket and the arm 9, the latter being of sufficiently greater cross-section than the shank of the bolt to form a shoulder against which the washer 11 abuts. When, therefore, the nut 8 is set up, the license plate 1 will be rigidly clamped to the support 3 between said nut and shoulder. The flanges 4—4 serve as stops to prevent rotation of the bolt while the wing nut is set up as shown in Fig. 3.

Although it is preferred to have the bracket formed with flanges to serve as stops this is not absolutely essential. The arm 9 of the bolt furnishes a convenient hand hold which may be grasped by one hand while the wing nut is being set up or unscrewed with the other hand.

What I claim is:

1. The combination with an automobile license plate and a support therefor, said plate and support having registering openings, of a bolt extending through said openings, one end of said bolt being threaded and the other end being bent to form a laterally extending arm which overlies the rear face of said support, said bolt having a shoulder which engages the rear face of the support adjacent the bolt opening and a nut on the threaded end of said bolt which is adapted to be set up to clamp said plate to said support between itself and said shoulder, said support having a stop adapted to be engaged by said lateral arm to limit the turning of the bolt on its axis in said opening.

2. The combination with an automobile license plate and a support therefor, said plate and support having registering openings, of a bolt extending through said openings, one end of said bolt being threaded and the other end having a shoulder and a unitary, laterally extending arm, and a nut on said threaded end rigidly clamping said plate to said support between itself and said shoulder, said support having a stop engaged by said arm to limit turning of said bolt in said openings.

3. The combination with an automobile license plate and a support therefor, said plate and support having registering bolt holes, of a bolt extending through said holes, one end of said bolt being threaded and the other end being bent to form a laterally extending arm which overlies the rear face of said support, a washer on said bolt between said lateral arm and said support, said washer being of greater diameter than the bolt hole in the support so that it engages the rear face of the support adjacent the bolt hole and a nut on the threaded end of said bolt, which when set up rigidly clamps said plate to said support between itself and said washer, said support having a stop adapted to be engaged by said lateral arm to limit the turning of the bolt on its axis.

4. A support for an automobile license plate comprising a plate adapted to be attached to an automobile, said plate having at its two opposite side edges longitudinal flanges extending at an angle to the plane of the plate, said plate having a bolt hole intermediate said flanges in combination with a license plate having a bolt hole adapted to register with said hole in the supporting plate, said license plate being positioned with its back against said supporting plate on the opposite side from said flanges, a bolt passing through the holes in said two plates, said bolt having the end which lies between said flanges bent to form an arm which is adapted to engage said flanges to limit the turning of the bolt, a washer on said bolt adjacent said arm which engages the supporting plate adjacent the hole therein, the other end of said bolt being threaded and a nut on said threaded portion adapted to clamp the license plate against said supporting plate.

In testimony whereof I affix my signature.

JOHN J. BROCK.